United States Patent
Bailey (10) Patent No.: US 10,069,790 B2
(45) Date of Patent: *Sep. 4, 2018

(54) DIRECT TRANSMISSION OF DATA BETWEEN APPLICATIONS IN A MULTI-TENANT ENVIRONMENT

(71) Applicant: International Business Machines Corporation, Armonk, NY (US)

(72) Inventor: Christopher N. Bailey, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,490

(22) Filed: May 12, 2017

(65) Prior Publication Data

US 2017/0250947 A1    Aug. 31, 2017

Related U.S. Application Data

(63) Continuation of application No. 14/678,013, filed on Apr. 3, 2015, now Pat. No. 9,736,108, which is a continuation of application No. 14/480,831, filed on Sep. 9, 2014, now Pat. No. 9,742,724.

(51) Int. Cl.
*H04L 29/12*    (2006.01)
*H04L 29/08*    (2006.01)
*G06F 9/54*    (2006.01)

(52) U.S. Cl.
CPC ............ *H04L 61/1547* (2013.01); *G06F 9/54* (2013.01); *H04L 61/2007* (2013.01); *H04L 67/1002* (2013.01); *H04L 67/1095* (2013.01); *H04L 67/141* (2013.01); *H04L 61/6063* (2013.01)

(58) Field of Classification Search
None
See application file for complete search history.

(56) References Cited

U.S. PATENT DOCUMENTS

| | | |
|---|---|---|
| 7,711,831 B2 | 5/2010 | Aiken, Jr. et al. |
| 8,259,571 B1 | 9/2012 | Raphel et al. |
| 8,452,726 B2 | 5/2013 | Kuruganti et al. |
| 2004/0250130 A1 | 12/2004 | Billharz et al. |
| 2010/0042722 A1 | 2/2010 | Klissner |
| 2011/0258614 A1 | 10/2011 | Tamm |
| 2011/0302277 A1 | 12/2011 | Baker |
| 2012/0192206 A1 | 7/2012 | Inglis et al. |

(Continued)

OTHER PUBLICATIONS

Das et al., "Live Database Migration for Elasticity in a Multitenant Database for Cloud Platforms", UCSB Computer Science Technical Report Sep. 2010, pp. 1-14.

(Continued)

*Primary Examiner* — Sargon Nano
*Assistant Examiner* — Christopher B Robinson
(74) *Attorney, Agent, or Firm* — Fusheng Xu; Brian M. Restauro (57) ABSTRACT

Overhead of sending data from one application to another by doing input and output processing can be costly. The present invention provides a method of transmitting data with a low overhead between applications in a multi-tenant runtime environment. The multi-tenant runtime detects a connection between tenants, and then performs low-overhead data transmission mechanisms by cloning data from one tenant space to another tenant space, while keeping the data isolated for two tenants.

20 Claims, 4 Drawing Sheets

(56) References Cited

U.S. PATENT DOCUMENTS

| | | |
|---|---|---|
| 2012/0246118 A1 | 9/2012 | Feng et al. |
| 2012/0331016 A1 | 12/2012 | Janson et al. |
| 2013/0191257 A1 | 7/2013 | Koodli et al. |
| 2014/0115584 A1 | 4/2014 | Mudigonda et al. |
| 2016/0072895 A1 | 3/2016 | Bailey |
| 2016/0072919 A1 | 3/2016 | Bailey |

OTHER PUBLICATIONS

"ORB Settings", Sun Java System Application Server 9.1 Performance Tuning, © 2010, Oracle Corporation and/or its affiliates, <http://docs.oracle.com/cd/E19159-01/819-3681/abegt/index.html>.

"How the ORB works", IBM Developer Kit and Runtime Environment, Java 2 Technology Edition, Version 1.4.2 Diagnostics Guide, Thirteenth Edition (Mar. 2009), Copyright International Business Machines Corporation 2003, 2009, <http://publib.boulder.ibm.com/infocenter/javasdk/v1r4m2/index.jsp?topic=%2Fcom.ibm.java.doc.diagnostics.142j9%2Fhtml%2Fhowtheorbworks.html>.

Appendix P—List of IBM Patents or Patent Applications Treated as Related, Filed herewith, 2 Pages.

United States Patent US 10,069,790 B2

DIRECT TRANSMISSION OF DATA BETWEEN APPLICATIONS IN A MULTI-TENANT ENVIRONMENT

BACKGROUND OF THE INVENTION

The present invention relates generally to the field of data management, and more particularly to data transfer process.

Data to be sent from one application to another is conventionally converted to a suitable transmission format (e.g., serialized), and transmitted, and then restored to its original shape by, for example, de-serializing the data. The associated performance cost of transmitting data by doing such input and output processing is generally high depending on different specific mechanisms.

Multitenancy refers to a principle in software architecture, also referred to as multi-tenant runtime environment, where a single instance of the software runs on a server, serving multiple client-organizations (tenants). Multitenancy contrasts with multi-instance architectures where separate software instances (or hardware systems) operate on behalf of different client organizations. With a multitenant architecture, a software application is designed to virtually partition its data and configuration, and each client organization works with a customized virtual application. Further, in a multitenant architecture, all of the underlying hardware and software is shared.

When applications are running in a multi-tenant runtime, for example, a multi-tenant Java Runtime Environment (JRE), it is possible that there will be two applications that would transmit data between themselves using network sockets. (Note: the term(s) "Java," "Java Runtime Environment," and/or "JRE" may be subject to trademark rights in various jurisdictions throughout the world and are used here only in reference to the products or services properly denominated by the marks to the extent that such trademark rights may exist.) (Java and all Java-based trademarks and logos are trademarks or registered trademarks of Oracle and/or its affiliates.) An example of this would be an application server and a database. A socket is one end-point of a two-way communication link between two applications running on a network. Each application binds a socket to its end of the link. To communicate, the client and the server each reads from and writes to the socket bound to the connection.

It is known, where data is routed directly, to determine that a particular socket lies between two sub-processes of a higher-up management layer. Direct routing may be performed through sharing a block of memory between processes or routing straight through the processing bus to avoid the network layer entirely. This is analogous to a hypervisor where the virtual machines (VMs) are guest operating systems (rather than Java virtual machines).

SUMMARY

According to an aspect of the present invention, there is a method, computer program product and/or system for direct transmission of data between applications in a multi-tenant environment that performs the following steps (not necessarily in the following order): (i) opening a server socket of a first tenant; (ii) placing an entry in a registry, the entry including an IP number and a port number used by the server socket; (iii) receiving a request for a connection by a second tenant to the server socket; (iv) storing a pairing entry that associates the first tenant with the second tenant; and (v) responsive to a connection being made between the first tenant and the second tenant, establishing a mechanism for transmitting data between the first tenant and the second tenant. Wherein: the mechanism includes, at least, one of the following: copying a byte array of the server socket from a first space assigned to the first tenant to a second space assigned to the second tenant; and intercepting an object earlier than a byte array level and deep copying the object and corresponding references from the first space assigned to the first tenant to the second space assigned to the second tenant.

BRIEF DESCRIPTION OF THE DRAWINGS

The present invention will now be described, by way of example only, with reference to preferred embodiments, as illustrated in the following figures.

DETAILED DESCRIPTION

The overhead cost of transferring data from one application to another can be significantly high as the data has to be converted into a transmission format prior to being sent, and the data has to be restored to its original shape after transmission. Some embodiments of the present invention provide a mechanism to transfer data between applications with a low transfer overhead in a multi-tenant environment. When two communicating applications establish a connection in a multi-tenant runtime, the data to be transferred is directly cloned in a new tenant and allocated in the new tenant space, reducing the transferring cost while keeping the data isolated. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
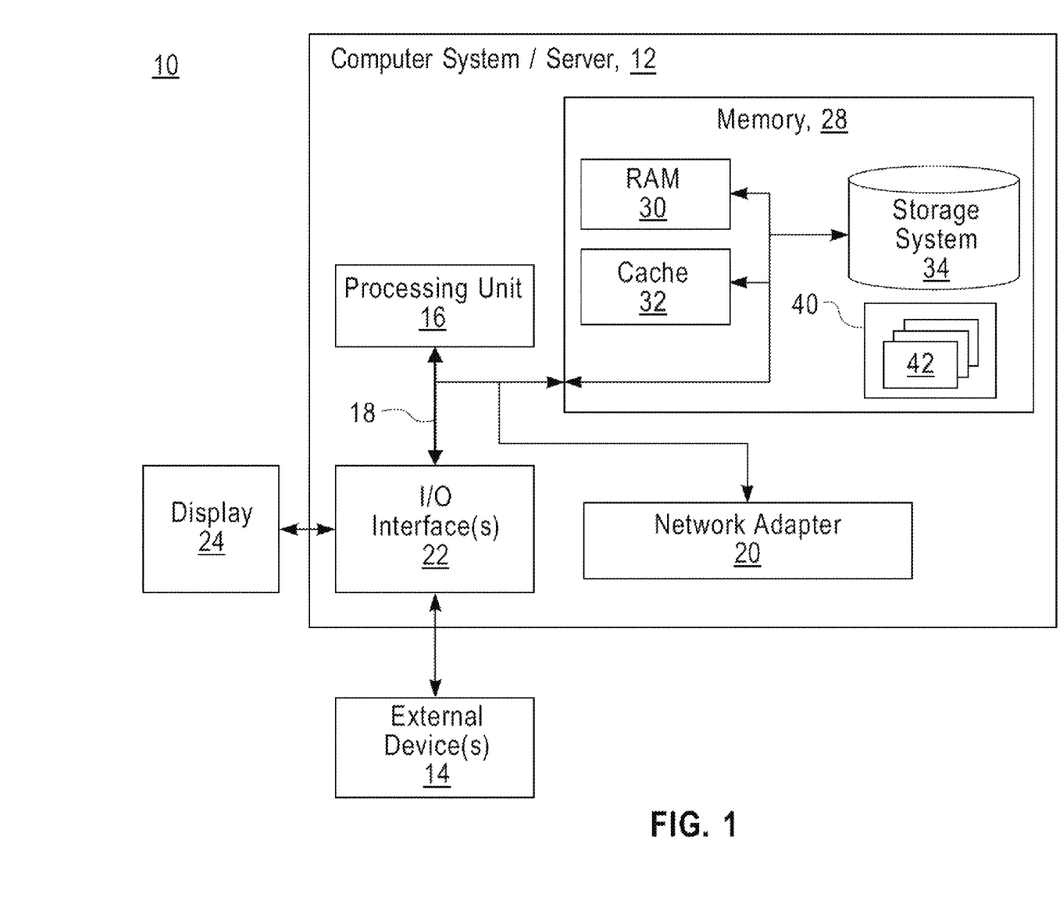
FIG. 1 depicts a cloud computing node used in a first embodiment of a system according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components, including system memory 28, to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
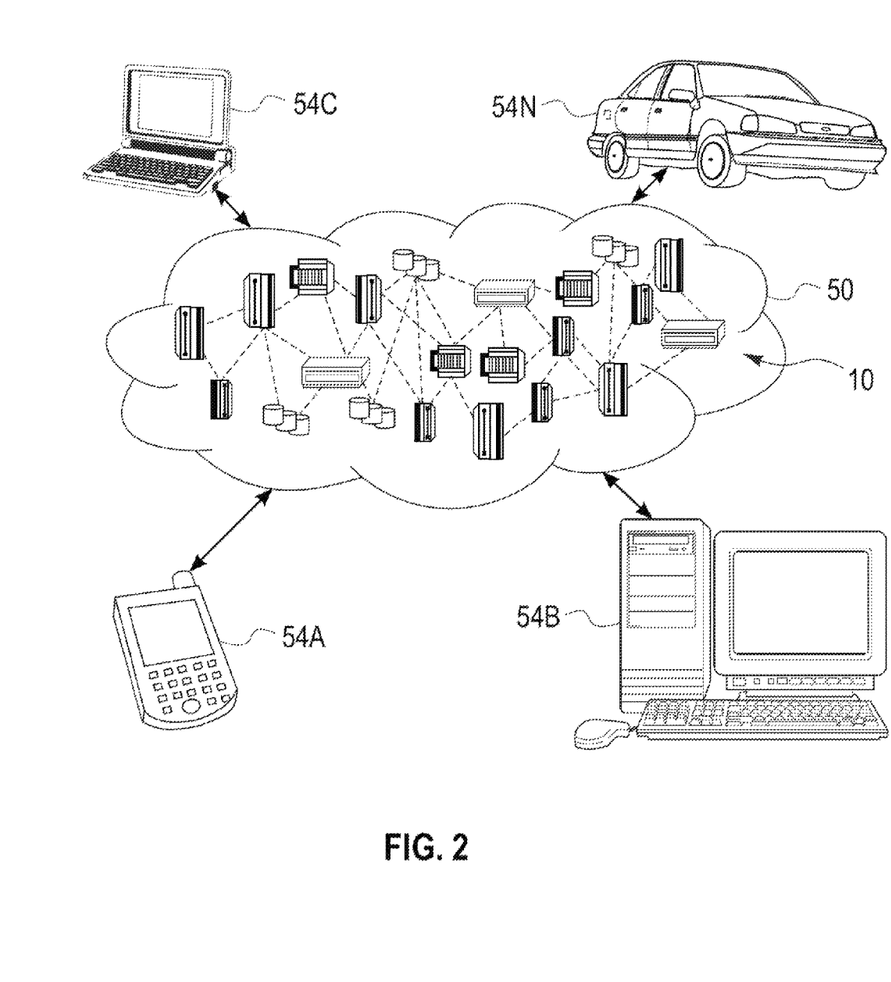
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices, used by cloud consumers, such as, for example, personal digital assistant (PDA) or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
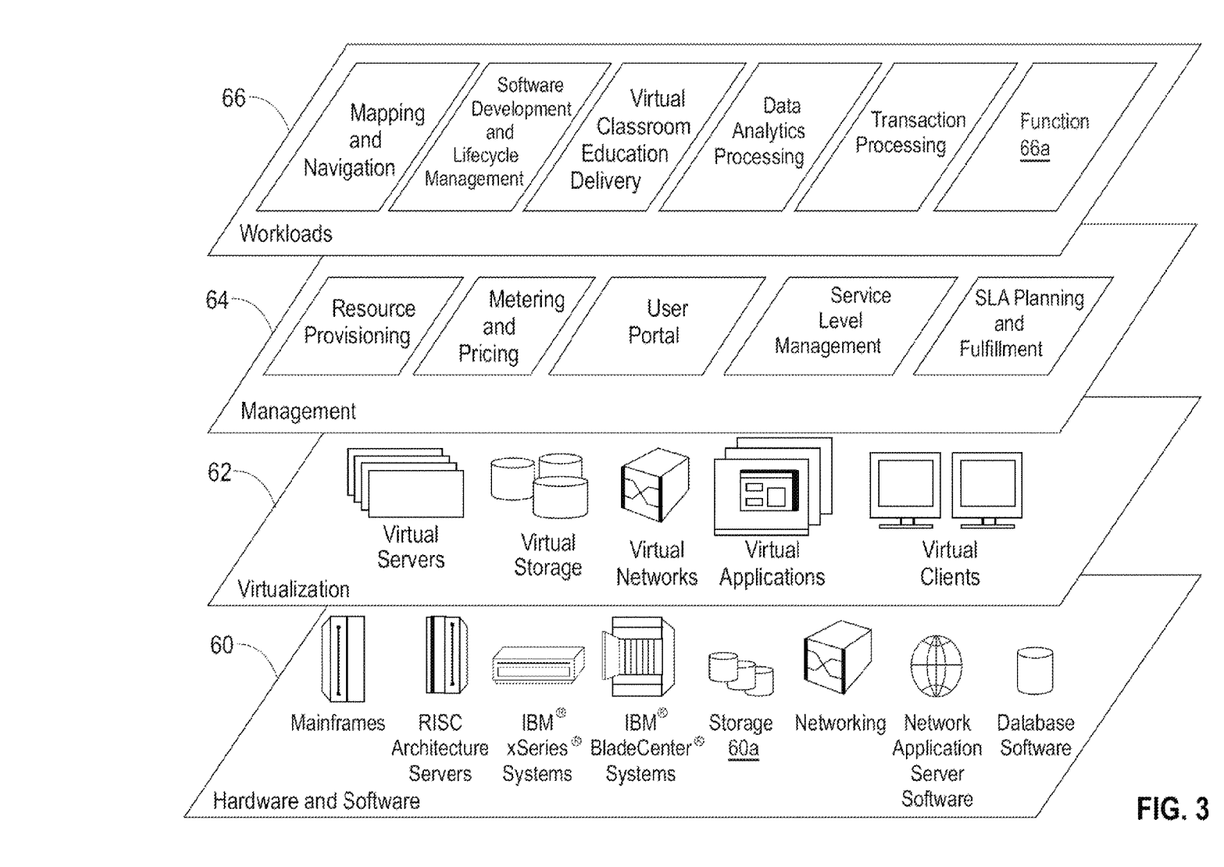
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices 60*a*; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66*a*) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 4:
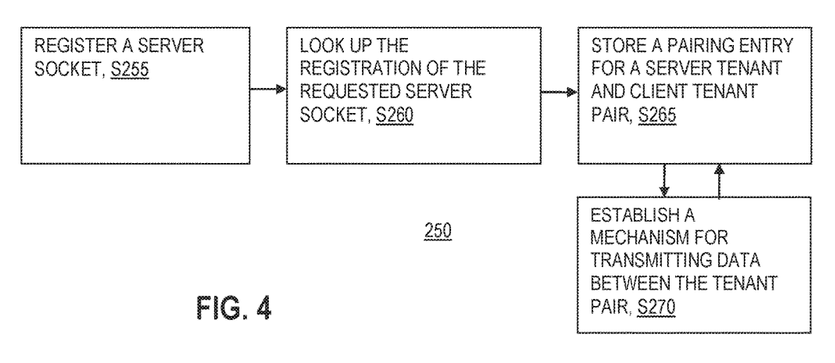
FIG. 4 is a flowchart showing a first embodiment method performed, at least in part, by the first embodiment system.
Figure 5:
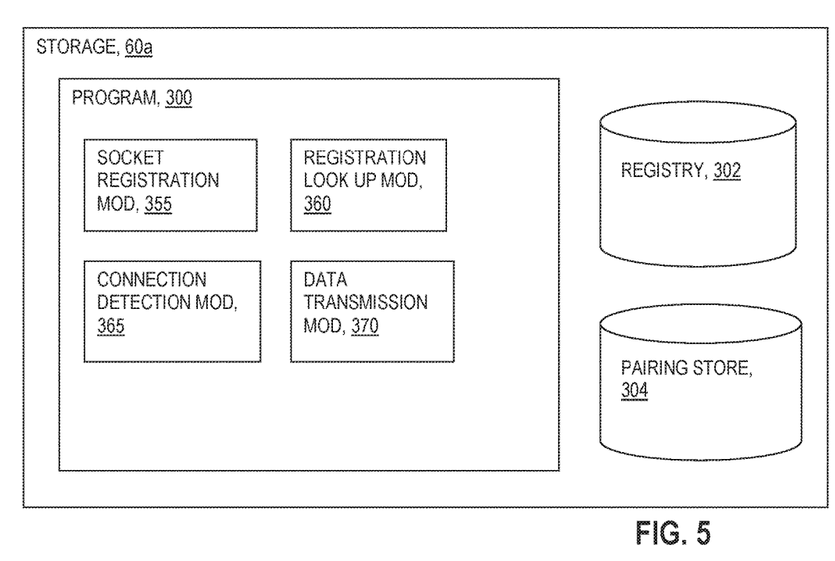
FIG. 5 is a block diagram view of a machine logic (for example, software) portion of the first embodiment system.

FIG. 4 shows flowchart 250 depicting a method according to the present invention. FIG. 5 shows program 300 for performing at least some of the method steps of flowchart 250. This method and associated software will now be discussed, over the course of the following paragraphs, with extensive reference to FIG. 4 (for the method step blocks) and FIG. 5 (for the software blocks). As shown in FIG. 5, one physical location where program 300 may be stored is in storage block 60a (see FIG. 3).

Data transmission program 300 operates, according to function 66a, to manage the data transmission between two applications running in a multi-tenant runtime. The applications are co-located inside the same runtime and process memory space, but must remain isolated from each other and are unaware of the presence of the other. Program 300 removes the need to create sockets and serialize/deserialize the data between the applications, and performs data transferring by converting a connection between the applications into a simple object clone in a new tenant space.

Processing begins at step S255, where socket registration module 355 registers sockets associated with each tenant. The multi-tenant runtime first needs to keep a registry of the network interfaces and sockets registered to each of the tenants. In this example, when a server socket is opened an entry is placed into registry 302 that details the IP and port number used by the socket. A socket is a combination of an IP address and a port number. For example, a first tenant is the Apache Derby Database (ADD), creating a server socket on port 1527 to allow queries against the database. Here Derby would have an entry in the registry for the IP for the network interface, and the port of 1527.

Processing proceeds to step S260, where registration lookup module 360 searches registry 302 to determine if a match is found upon a client connection being requested to the server socket. The tenant using the registered server socket, herein being called the server tenant, listens to the server socket for a client, herein being called the client tenant, to make a connection request. The client tenant knows the IP address and the port number on which the tenant server listens. To make a connection request, the client tenant attempts to communicate with the server tenant. The client tenant also identifies itself to the server tenant by informing the server tenant of the socket associated with it including the IP address and the port number registered to the multi-tenant runtime. Upon such connection request being made, the runtime looks up the entry associated with the server socket in the registry. For example, a second tenant (the client tenant) is the Apache Tomcat Application Server (ATAS), wanting to query some data from the first tenant (the server tenant): the ADD. The ATAS uses a Java Database Connectivity (JDBC) connection request to the ADD. As part of the client socket connection, a lookup is done using registry 302.

Note: the term(s) "Apache," "Derby," "Apache Derby Database," "ADD," "Tomcat," "Apache Tomcat Application Server," "ATAS," "Java Database Connectivity," and/or "JDBC" may be subject to trademark rights in various jurisdictions throughout the world and are used here only in reference to the products or services properly denominated by the marks to the extent that such trademark rights may exist.

Processing proceeds to step S265, where connection detection module 365 stores a pairing entry between the client and the server upon finding the entry associated with the server socket. In this example, the runtime searches the server socket entry in the registry and determines that the entry matches the server socket being requested by the client tenant to make a connection. A pairing entry between the client tenant and the server tenant is stored in pairing store 304. Alternatively, the pairing entry is stored in registry 302. For example, the entry (including IP and port 1527) of the server socket associated with the ADD stored in registry 302 is searched upon request by the ATAS.

Processing proceeds to stop at step S270, where data transmission module 370 establishes a low overhead mechanism for transmitting data upon detecting the connection. Once the connection request is accepted by the server tenant in step S265, the client tenant and the server tenant can now communicate through the connection by writing to or reading from their sockets. In this example, upon detection by the runtime of the connection between the server tenant and the client tenant, a data transmission mechanism with a low overhead is conducted to transfer data between the server tenant and the client tenant. For example, upon finding the IP/port of the ADD in registry 302, a direct memory connection is made to the ADD. Alternatively, a normal external socket connection may be made if no matching entry is found. The type of transfer mechanism and the relative overhead saving is dependent on the type of data being passed over the connection. In this example, once step S270 is completed, processing proceeds to end. Alternatively, processing proceeds back to step S260 and waits for the next operation request.

III. Further Comments and/or Embodiments

Some embodiments of the present invention recognize the following facts, potential problems and/or potential areas for improvement with respect to the current state of the art: (i) the performance cost of doing input and output processing for an application that wants to send data to another application is significant; (ii) conventionally, data to be sent is serialized, transmitted, and then deserialized that induce high overhead of data transmission; (iii) in a multi-tenant runtime, applications located inside the same runtime and process memory space are required to remain isolated from one another; (iv) conventional solutions speed up the data transfer process by sharing buffers or routing the buffers directly to targets; and/or (v) in a situation with computer programming languages, such as Java, data needs to be converted into a stream of bytes suitable to transferring over a wire.

Applications running in a multi-tenant runtime are co-located inside the same runtime and process memory space, but are required to remain isolated from each other. In this scenario, it would be beneficial to have a mechanism to minimize or remove the cost of transferring data from one application to another. According to some embodiments of the present invention, the multi-tenant runtime is able to detect that an outgoing socket connection request from one application (e.g., a server) to the other (e.g., a database) is actually a connection to another tenant in the same runtime as it remains a registration entry containing the virtual IP addresses and port usage associated with each tenant. When such a connection request is made, the multi-tenant runtime can remove, for example, the need to create the sockets and to serialize/deserialize the data, and is able to convert the connection to a data transmission mechanism with a low overhead (e.g., a simple object clone in the new tenant space).

Some embodiments of the present invention comprise two parts: (i) determining that the endpoint of a connection actually lies within the same environment (e.g., a detection that a data connection is being requested between two tenants in a multi-tenant runtime); and (ii) modifying the transport protocol for the data that would have previously been sent over the wire (e.g., performing a low overhead mechanism for transferring the data that avoids a high transmission overhead associated with conventional data transmission mechanisms).

Some embodiments of the present invention directly clone the data between the server tenant and the client tenant. In such case, a byte array is created, manipulated, and then transferred. It is only at the point of transfer that the data is finalized, and can be cloned directly into the other tenant. Specifically, for general socket connections it is possible to get the input stream or output stream from the socket object itself. Where a paired call of write ( ) and read ( ) occurs, then the byte arrays used for the calls can simply be copied (cloned) from one tenant space to the other (e.g., from the server tenant to the client tenant).

Some embodiments of the present invention involve transmission of an object or a group of objects between the server tenant and the client tenant. In such case, where an object or a group of objects are being serialized, the objects themselves can be copied directly, although, in such a case, it is required that a deep copy of all objects be performed rather than a shallow (single object) copy. Herein an object is a composite data type, and the copying of a data object is an action in computing where the data object has its attributes copied to another object of the same data type.

For a shallow copying process, all of the field values of a data object are copied into another data object. For example, if the field value is a memory address it copies the memory address, and if the field value is a primitive type it copies the value of the primitive type. For a deep copying process, the data is actually copied over. The result of the deep copying process is different than the result of a shallow copy. The advantage is that the two data objects do not depend on each other but at the cost of a slower and more expensive copy. Specifically, where the type of the input stream and output stream of the sockets involved in the paired call of write ( ) and read ( ) calls, is an object output stream and an object input stream, then the data can be intercepted earlier than at the byte array level. The writeObject method can be used to carry out a deep copy of the object and its reference from one tenant space to the other (e.g., from the server tenant space to the client tenant space).

Some embodiments of the present invention may include one, or more, of the following features, characteristics and/or advantages: (i) provides the ability to copy data without using a socket between tenants in a multi-tenant environment; (ii) removes the need to serialize/deserialize the data to be transmitted; (iii) minimizes/removes the cost of data transferring between applications while keep applications isolated; and/or (iv) provides flexible transfer mechanisms with different relative overhead savings that are dependent on the type of data being passed.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for direct transmission of data between applications in a multi-tenant environment, the method comprising:

determining if a first tenant and a second tenant exist within a same runtime;

responsive to the first tenant and the second tenant not existing within the same runtime, opening a server socket of a first tenant;

placing an entry in a registry, the entry including an IP number and a port number associated with the first tenant;

storing a pairing entry that associates the first tenant with the second tenant;

responsive to determining the first tenant and the second tenant exist within the same runtime and the transmission method having a high overhead, establishing a mechanism for transmitting data between the first tenant and the second tenant, wherein the mechanism for transmitting data between the first tenant and the second tenant has a low overhead for transmitting data; and responsive to a connection being made between the first tenant and the second tenant and the opening of the server socket of the first tenant, establishing the mechanism for transmitting data between the first tenant and the second tenant.

2. The method of claim 1, wherein the mechanism includes at least one of the following:

copying a byte array of the server socket from a first space assigned to the first tenant to a second space assigned to the second tenant; and intercepting an object prior to the forming of a byte array level and deep copying of the object and corresponding references from the first space assigned to the first tenant to the second space assigned to the second tenant.

3. The method of claim 1, wherein when the mechanism includes copying a byte array, finalizing the data at the point of transmission.

4. The method of claim 3, wherein:
the byte array for the server socket is used for a paired call; and
the paired call includes a write method and a read method.

5. The method of claim 1, wherein when the mechanism further includes deep copying, the deep copying of the object and corresponding references is carried out by a write object method.

6. The method of claim 1, wherein the mechanism for transmitting data includes maintaining any transmitted data isolated from the first tenant with respect to the second tenant after transmission is completed, in such ways as by directly cloning the transmitted data.

7. The method of claim 1, further comprising:
detecting the connection being made between the first tenant and the second tenant.

8. The method of claim 1, further comprising:
responsive to receiving a request for a connection via the server socket, looking up the IP number and the port number used by the server socket in the registry.

9. A computer program product for direct transmission of data between applications in a multi-tenant environment, the computer program product comprising:
one or more computer readable storage media and program instructions stored on the one or more computer readable storage media, the program instructions comprising:
program instructions to determine if a first tenant and a second tenant exist within a same runtime;
program instructions to, responsive to the first tenant and the second tenant not existing within the same runtime, open a server socket of a first tenant;
program instructions to place an entry in a registry, the entry including an IP number and a port number associated with the first tenant;
program instructions to store a pairing entry that associates the first tenant with the second tenant;
program instructions to, responsive to determining the first tenant and the second tenant exist within the same runtime and the transmission method having a high overhead, establish a mechanism for transmitting data between the first tenant and the second tenant, wherein the mechanism for transmitting data between the first tenant and the second tenant has a low overhead for transmitting data; and
program instructions to, responsive to a connection being made between the first tenant and the second tenant and the opening of the server socket of the first tenant, establish the mechanism for transmitting data between the first tenant and the second tenant.

10. The computer program product of claim 9, wherein the mechanism includes at least one of the following:
copying a byte array of the server socket from a first space assigned to the first tenant to a second space assigned to the second tenant; and intercepting an object prior to the forming of a byte array level and deep copying of the object and corresponding references from the first space assigned to the first tenant to the second space assigned to the second tenant.

11. The computer program product of claim 9, wherein when the mechanism includes copying a byte array, finalizing the data at the point of transmission.

12. The computer program product of claim 11, wherein:
the byte array for the server socket is used for a paired call; and
the paired call includes a write method and a read method.

13. The computer program product of claim 9, wherein when the mechanism further includes deep copying, the deep copying of the object and corresponding references is carried out by a write object method.

14. The computer program product of claim 9, wherein the mechanism for transmitting data includes maintaining any transmitted data isolated from the first tenant with respect to the second tenant after transmission is completed, in such ways as by directly cloning the transmitted data.

15. A computer system for direct transmission of data between applications in a multi-tenant environment, the computer system comprising:
one or more computer processors;
one or more computer readable storage media; and
program instructions stored on the one or more computer readable storage media for execution by at least one of the one or more computer processors, the program instructions comprising:
program instructions to determine if a first tenant and a second tenant exist within a same runtime;
program instructions to, responsive to the first tenant and the second tenant not existing within the same runtime, open a server socket of a first tenant;
program instructions to place an entry in a registry, the entry including an IP number and a port number associated with the first tenant;
program instructions to store a pairing entry that associates the first tenant with the second tenant;
program instructions to, responsive to determining the first tenant and the second tenant exist within the same runtime and the transmission method having a high overhead, establish a mechanism for transmitting data between the first tenant and the second tenant, wherein the mechanism for transmitting data between the first tenant and the second tenant has a low overhead for transmitting data; and
program instructions to, responsive to a connection being made between the first tenant and the second tenant and the opening of the server socket of the first tenant, establish the mechanism for transmitting data between the first tenant and the second tenant.

16. The computer system of claim 15, wherein the mechanism includes at least one of the following:
copying a byte array of the server socket from a first space assigned to the first tenant to a second space assigned to the second tenant; and intercepting an object prior to the forming of a byte array level and deep copying of the object and corresponding references from the first space assigned to the first tenant to the second space assigned to the second tenant.

17. The computer system of claim 15, wherein when the mechanism includes copying a byte array, finalizing the data at the point of transmission.

18. The computer system of claim 17, wherein:
the byte array for the server socket is used for a paired call; and
the paired call includes a write method and a read method.

19. The computer system of claim 15, wherein when the mechanism further includes deep copying, the deep copying of the object and corresponding references is carried out by a write object method.

20. The computer system of claim 15, wherein the mechanism for transmitting data includes maintaining any transmitted data isolated from the first tenant with respect to the second tenant after transmission is completed, in such ways as by directly cloning the transmitted data.

* * * * *